United States Patent
Gray et al.

(10) Patent No.: US 8,095,397 B2
(45) Date of Patent: Jan. 10, 2012

(54) VARIABLE ANNUITY WITH A GUARANTEED MINIMUM ACCUMULATION BENEFIT BASED ON AN EXTERNAL INDEX

(75) Inventors: Matthew Whitman Gray, Fridley, MN (US); Adam Michael Brown, Maple Grove, MN (US)

(73) Assignee: Allianz Life Insurance Company of North America, Minneapolis, MN (US)

( * ) Notice: Subject to any disclaimer, the term of this patent is extended or adjusted under 35 U.S.C. 154(b) by 417 days.

(21) Appl. No.: 12/478,809

(22) Filed: Jun. 5, 2009

(65) Prior Publication Data

US 2009/0307016 A1 Dec. 10, 2009

Related U.S. Application Data

(60) Provisional application No. 61/059,484, filed on Jun. 6, 2008.

(51) Int. Cl.
*G06Q 40/00* (2006.01)
(52) U.S. Cl. ............... 705/4; 705/35; 705/36; 705/36 R
(58) Field of Classification Search ............... 705/4, 35, 705/36, 36 R
See application file for complete search history.

(56) References Cited

U.S. PATENT DOCUMENTS

| | | | |
|---|---|---|---|
| 2004/0181436 A1* | 9/2004 | Lange | 705/4 |
| 2007/0100720 A1* | 5/2007 | Bonvouloir | 705/36 R |
| 2009/0138406 A1* | 5/2009 | Reinkemeyer et al. | 705/36 R |

OTHER PUBLICATIONS

Joseph, Jeff, "Overlay Uses 101" Investment Advisor Jul. 2007.*
American Academy of Actuaries, "Proposed New Risk-Based Capital Method for Separate Accounts that Guarantee an Index" Jun. 23, 2003.*
Penn Mutual, "Penant Select Variable Annuity" Aug. 2007.*
Business Wire, "RiverSource Annities Launces Guaranteed Minimum Accumulation Benefit . . . " Jan. 31, 2006.*

* cited by examiner

*Primary Examiner* — Neal Sereboff
(74) *Attorney, Agent, or Firm* — Wong, Cabello, Lutsch, Rutherford & Brucculeri, LLP

(57) ABSTRACT

Products, methods and system for guaranteeing the minimum accumulation benefit of an investment account owned by an entity are described. The steps of the guarantee include determining an external index or method to use to calculate the guarantee at the end of the defined investment period; allowing the owner of the investment account to select from available investment options; and at the end of the investment period crediting the investment account the difference of the current value of the investment account and the calculated minimum value of the investment account if the investment account has not increased in value above the calculated minimum.

27 Claims, 4 Drawing Sheets

VARIABLE ANNUITY WITH A GUARANTEED MINIMUM ACCUMULATION BENEFIT BASED ON AN EXTERNAL INDEX

CROSS REFERENCE TO RELATED APPLICATIONS

This application claims priority to U.S. Provisional Patent Application Ser. No. 61/059,484 entitled "Variable Annuity with a Guaranteed Minimum Accumulation Benefit Based on an External Index", filed Jun. 6, 2008 which is hereby incorporated by reference in its entirety.

FIELD OF THE DISCLOSURE

This disclosure relates generally to the field of annuity contracts, and more particularly, but not by way of limitation, to a variable annuity with a guaranteed minimum accumulation benefit (GMAB) feature.

BACKGROUND

An annuity is a close financial cousin to a life insurance contract and pays periodic income benefits for a specific period of time or over the course of a lifetime. Life insurance companies offer annuities. There are two basic types of annuities: deferred and immediate. Deferred annuities allow assets to grow over time before being converted to income payments. Immediate annuities begin payments immediately, or within a year of purchase.

The act of converting a deferred annuity to income is known as annuitization. The value of funds being converted to income is known as the annuitization value. In sum, a deferred annuity allows the covered person to accumulate funds for retirement and then receive a guaranteed income payable for a specified period or for life.

An annuity may be fixed or variable. The U.S. Securities and Exchange Commission typically does not regulate fixed annuities, but it does regulate variable annuities. In a fixed annuity, all assets underlying the annuity are held in the insurer's general account with the insurer bearing the investment risk. In a variable annuity, the insurer will hold all the assets underlying the annuity in a separate account and the annuity owner bears the investment risk, directly participating in the gains and losses of those assets, net of any fees. These separate account assets are composed of assets in specified variable annuities which are invested in specified investment subaccounts provided within the annuities. These investment subaccounts are not publicly traded.

In entering an annuity contract, the annuity owner pays a premium in return for guaranteed income payments. Many deferred annuities allow annuity owners to deposit additional money, possibly restricted to periods of time or to maximums or minimums. In return, the annuity owner is entitled to receive an income stream in the form of periodic payments after a certain holding period, which is known in the art as the accumulation phase or period. Typically the annuity owner can choose when to annuitize and begin receiving income payments from the insurer. The period over which income is received is known as the payout or income phase or period.

Outside of an annuity, an individual can attempt to self-fund their retirement income by making regular withdrawals from their asset portfolio. Self-funding allows the individual to retain control and ownership over their assets instead of exchanging them for an annuity contract which could guarantee income payments for life. With self-funding, however, there is no guarantee that those withdrawals can continue for their lifetime without depleting the asset portfolio. Investment return performance shortfall and/or volatility as well as longevity of life are two risks which could significantly impact the ability of the asset portfolio to support these withdrawals for the individual's entire lifetime.

A guaranteed minimum accumulation benefit (GMAB) is a benefit which can be associated with an annuity which guarantees a minimum accumulation value after the accumulation period or a set period of time. This guaranteed value could be based on the amount invested or on prior gains. This guarantee protects the value of the annuity and the annuitant from market fluctuations. This benefit may be optional to an annuity for an added cost, which varies by each annuity contract or issuing firm. The GMAB will be "in-the-money" only if the market value of the annuity is below the minimum guaranteed value.

SUMMARY

In one embodiment an annuity product is disclosed which provides a guaranteed minimum accumulation benefit (GMAB) for an investment account. This GMAB is provided to an entity by an insurer. The GMAB is for a predefined investment period and calculated using a guarantee percentage increase. The guarantee percentage increase is based at least in part on an external index.

In another embodiment, an annuity product is disclosed which determines an external index percentage and a GMAB is determined by the external index percentage and attached to an investment account for a specified investment period. The GMAB is equal to the value of the investment account at start of the investment period compounded by the external index percentage.

In a further embodiment, a method of guaranteeing minimum accumulation of an investment account owned by an entity is disclosed. This method has the steps of determining a value of an external index, defining an investment period, setting parameters for available investment options for the investment period, calculating a minimum value of the investment account at end of the investment period based on the value of the external index compounded for the investment period, and crediting to the investment account the difference of value of the investment account at end of the investment period and the calculated minimum if value of the investment account at end of the investment period is less than the calculated minimum.

In a further embodiment, a method of guaranteeing minimum accumulation of an investment account owned by an entity is disclosed. This method has the steps of determining a value of an external index and a method for calculating a guarantee percentage, defining an investment period, setting parameters for available investment options for the investment period, calculating a minimum value of the investment account at end of the investment period based on the value of the external index for the investment period, and crediting the investment account the difference of value of the investment account at end of the investment period and the calculated minimum if value of the investment account at end of the investment period is less than the calculated minimum.

In a further embodiment, an annuity product is disclosed. The annuity product provides a GMAB for an investment account to an entity by an insurer. The GMAB is for one or more predefined periodic investment periods and may reset at transition between the investment periods.

In a further embodiment, an annuity product is disclosed. The annuity product comprises an external index and a method for calculating a guarantee percentage; and a guaranteed minimum accumulation benefit, determined by the guarantee percentage, attached to an investment account for a specified investment period. The GMAB is equal to the value of the investment account at start of the investment period multiplied by the guarantee percentage.

DETAILED DESCRIPTION

Aspects of this disclosure are described as a method of control or manipulation of data and may be implemented in one or a combination of hardware, firmware, and software. Embodiments may also be implemented as instructions stored on a machine-readable storage medium which may be read and executed by at least one processor to perform the operations described herein. A machine-readable storage medium may include any mechanism for the non-volatile recording of information in a form readable by a machine (e.g., a computer). For example, a machine-readable storage medium may include read-only memory (ROM), random-access memory (RAM), magnetic disc storage media, optical storage media, flash-memory devices, electrical, optical, acoustical or other forms of tangibly embodied computer instructions.

In the following detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Figure 1:
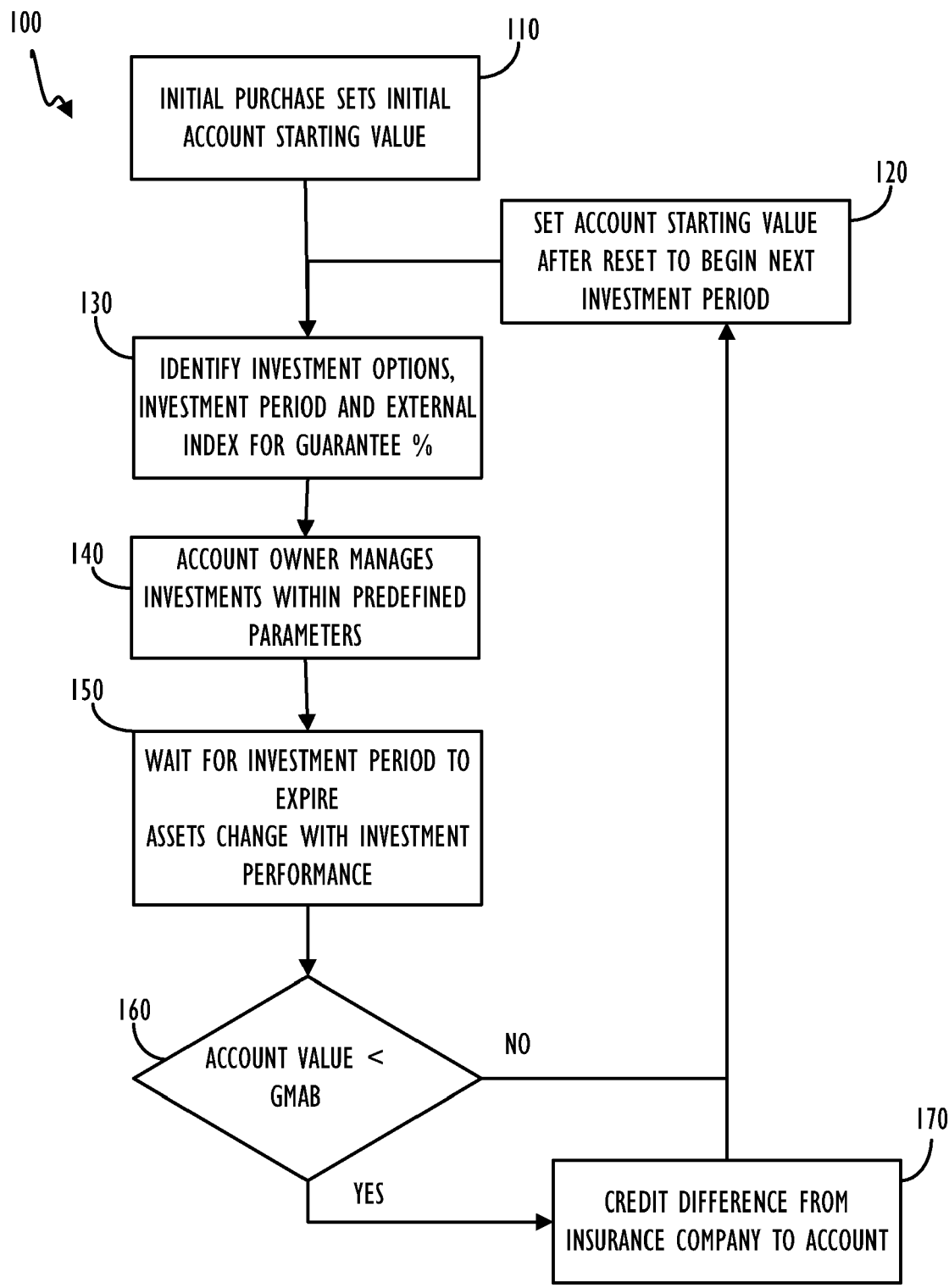
FIG. 1 shows, in flowchart form, one embodiment of this disclosure.

FIG. 1 shows a process flow 100 describing one embodiment. Starting at block 110, the initial value of the investment account to be insured with a guaranteed minimum accumulation over a defined period of time is determined. The asset account may be owned by the investor and managed by a company other than the guarantor as discussed herein. Several factors need to be determined at the beginning of each investment period as shown in block 130. The external index is identified (block 130) and its value at the start of the period provides the percentage increase that is guaranteed for this account at the end of the defined investment period. By applying the value of the investment account at the beginning of the period to the calculated guaranteed return, a guaranteed minimum accumulation benefit (GMAB) is determined in one embodiment as follows: $AV^*(1+GR)^P$, where AV=Account Value; GR=Guaranteed Rate of Return by year (based on external index in one embodiment); P=Period in years. At the beginning of the investment period, investment parameters are defined (block 130) so that the owner of the account may manage their own investments throughout the investment period (block 140) while adhering to these predefined rules. When the investment period is over (block 150), the assets have changed in value over the investment period based on the owner's investment options and performance of the market.

At decision block 160 it is determined if the actual account value at the end of the investment period is less than the guaranteed minimum accumulation benefit (GMAB). If the account value is below the GMAB, flow continues to block 170 where the insurer credits the difference between the GMAB and the current account value into the account. If the account is above the GMAB the insurance company (i.e. guarantor) does not credit anything. In either case flow continues to block 120 where another investment period may begin from the then current account value. A new guaranteed rate of return is determined and the process begins again.

Figure 2:
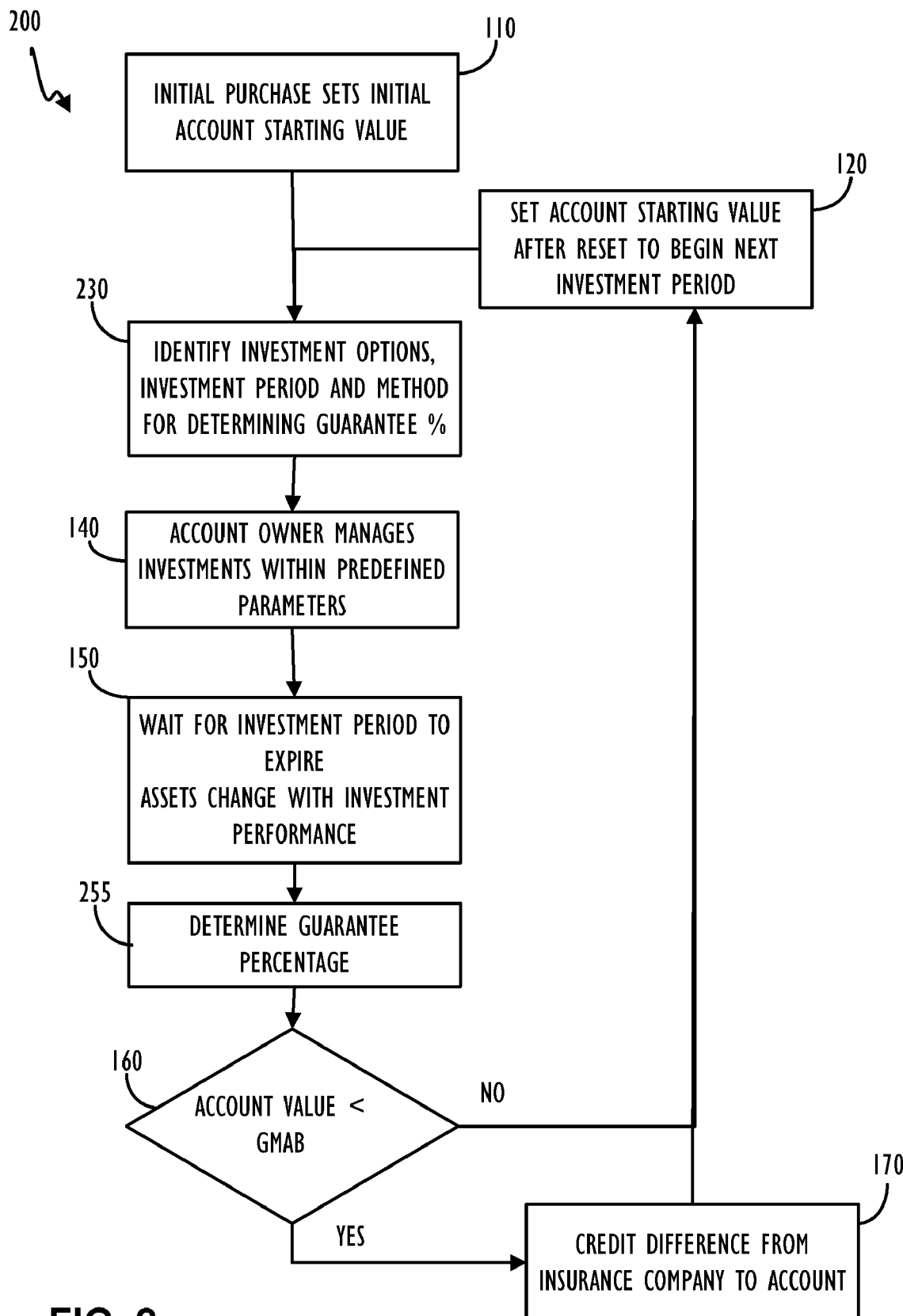
FIG. 2 shows, in flowchart form, an alternate embodiment of this disclosure with the guaranteed percentage determined at the end of the investment period.

Referring now to FIG. 2, an alternate embodiment, shown as process flow 200, the guarantee is based on a pre-established external index and a pre-defined method for determining the guarantee percentage (block 230). The actual guarantee percentage is calculated when investment period ends (block 255). This embodiment may cause the actual guarantee percentage to not be known until the end of the guarantee period. An example of this embodiment would be x% of S&P growth over the guarantee period. The growth would not be known until the end of the guarantee period when the S&P growth is calculated. As will be apparent to those of skill in the art, the process of determining a guaranteed rate of return that leads to the calculation of the GMAB can be as complex as the guarantor chooses to make it and may take into account any external indexes, combination of external indexes, or any traceable variable.

In yet another embodiment, the external index may be used in other ways than only determining the GMAB. For example, the external index may also determine the basis for which any guaranteed living benefit may be payable under an annuity contract (e.g., guaranteed lifetime withdrawal benefit, guaranteed minimum income benefit). External indexes are well known in the art and include (but are not limited to): SWAPs, LIBOR, CMT of different durations, CPI, CODI, and treasury corporate bonds. In addition, a window of time may be allowed to declare the value used for the guarantee. That is to say, contracts issued each day within January may have guarantees based off the January $1^{st}$ CMT rate instead of each having a potentially different rate because the rate may change daily.

In alternate embodiments, the external index may also be used to include a change due to the performance of an underlying hedge strategy. In one such embodiment, the investment strategy drives the account value performance. Part of the investment strategy uses options on an index so there is some relationship to the selected index but the index itself does not define the guarantee. Thus, the living benefit guarantee may have a base minimum amount which can increase if there is strong investment performance from the mutual fund and overlay strategy. For example, index options may be purchased periodically (e.g., quarterly, semi-annually) with the option structure remaining fixed over the period based on an overlay strategy. Overlay strategies may be selected by a contract purchaser. The contract purchaser would determine how much they wanted to invest in a particular fund plus overlay combination. Different examples of periodic purchases include spending the same amount each period (e.g., 1% of account value) and buying as many options as possible for this amount, buying the same overlay strategy each period and paying whatever it costs to renew the strategy, or varying the overlay strategy (strikes/caps/notionals on calls, puts) based on current pricing environment at the time of each (re)purchase. A specific example of this embodiment may include providing downside protection for an investment account by allocating a percentage of the investment toward put options for the external index. Thus, it may be possible to provide a higher guarantee because the upside potential is leveraged, via these put options, against market performance contrary to expectation.

An example of an embodiment is shown in table 1. The figures in table 1 show a cycle of three full investment periods. Each with different investment performance over their respective investment periods. The first period begins at time zero and runs through year 5. The guaranteed rate for this period is four percent. The initial account value is $100,000. Therefore, at the end of five years of accumulation at the minimum of four percent the account value must be at least $121,665.29 which represents a four percent per year increase compounded annually. As can be seen in the table, the cumulative investment performance in years one through five is below this amount by $11,665.29 and therefore the amount of guarantee credited into the account by the insurance company is equal to $11,665.29 and at the end of year five the account value is $121,665.29.

In years six through 10 the guaranteed rate is 3.5% and the investments outperform this rate for that period so at the end of the period the insurance company does not have to credit anything into the account. In years 11 through 15 the guaranteed rate is 3.75% and the investments actually go down in value. At the end of year 15 the insurance company must credit $37,055.73 in order to make up for the deficit in the account caused by poor performance of the investments. Note that the guarantee to be credited at the end of each five year period is based on the actual account value at the end of the previous period after any adjustments have been made.

TABLE 1

| Initial Purchase Payment: | $100,000.00 | | | |
| 5-year Guaranteed Rate at issue (GR): | 4.00% | | | |
| Guaranteed Account Value: | $121,665.29 = $100,000 × (1 + 4%)$^5$ | | | |

| Contract Year | End of Year Account Value | Guaranteed Rate | End of Period Guaranteed Account Value | Guarantee Credited | End of Year Account Value after Guarantee |
| --- | --- | --- | --- | --- | --- |
| 0 | 100,000.00 | | | | |
| 1 | 102,000.00 | 4.00% | 121,665.29 | | 102,000.00 |
| 2 | 104,000.00 | | 121,665.29 | | 104,000.00 |
| 3 | 106,000.00 | | 121,665.29 | | 106,000.00 |
| 4 | 108,000.00 | | 121,665.29 | | 108,000.00 |
| 5 | 110,000.00 | | 121,665.29 | +$11,665.29 | 121,665.29 |
| 6 | 125,665.29 | 3.50% | 144,500.20 | | 125,665.29 |
| 7 | 131,165.29 | | 144,500.20 | | 131,165.29 |
| 8 | 138,665.29 | | 144,500.20 | | 138,665.29 |
| 9 | 146,165.29 | | 144,500.20 | | 146,165.29 |
| 10 | 153,665.29 | | 144,500.20 | +$0.00 | 153,665.29 |
| 11 | 155,665.29 | 3.75% | 184,721.02 | | 155,665.29 |
| 12 | 153,665.29 | | 184,721.02 | | 153,665.29 |
| 13 | 151,665.29 | | 184,721.02 | | 151,665.29 |
| 14 | 149,665.29 | | 184,721.02 | | 149,665.29 |
| 15 | 147,665.29 | | 184,721.02 | +$37,055.73 | 184,721.02 |
| 16 | 189,721.02 | 4.00% | 224,741.37 | | 189,721.02 |

Note:
Guarantee starting on the 5$^{th}$ anniversary and credited on the 10$^{th}$ anniversary is based on account value on the 5$^{th}$ anniversary.

Withdrawals (with or without a surrender charge) could reduce the guaranteed contract value proportionally or dollar-for-dollar. For the example contract in Table 1, the rule may be proportional (i.e., If the contract holder withdrew $54,000 at the end of year 4, guaranteed account value would reduce to $60,832.65).

In alternate embodiments, additional premiums may be allowable. These additional premiums may be allowed at any time or may be limited to a period of time, for example for three years. If allowed, the additional premiums may impact the guarantee in a variety of ways. In one embodiment, additional premiums can be paid at any time, but those premiums and any gains or losses on those premiums will not be used to calculate the GMAB at the end of term. In another embodiment, additional premiums will increase the GMAB at the end of the term by the amount of the premium paid plus interest at the guaranteed rate of return for the remainder of the term. Another embodiment may allow additional premiums in the first year of a term and calculate the GMAB as if the premium were paid at the beginning of the term.

Figure 3:
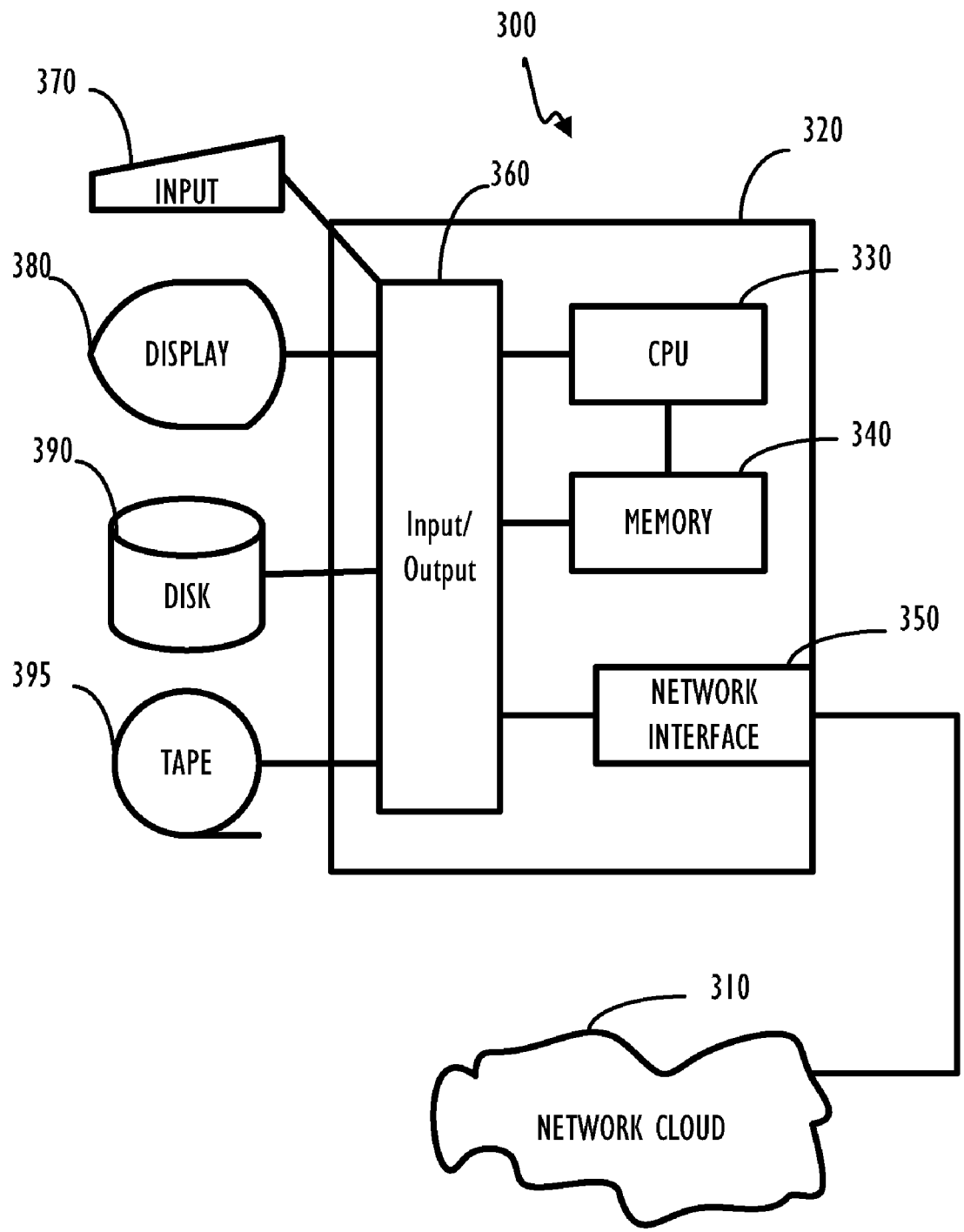
FIG. 3 shows, in block diagram form, a general purpose computer system in accordance with various embodiments of this disclosure.

Referring to FIG. 3, a general purpose computer and network 300 comprising a network cloud 310 and a general purpose computer 320 programmed to perform methods in accordance with this disclosure (e.g., those illustrated in FIGS. 1-2) includes host processor 330, display unit 380 and external storage units 395 (tape) and 390 (disk storage, such as magnetic or optical). Host processor 320 comprises input-output (I/O) interface 360, central processing unit 330, memory 340 and network interface 350. Display 380 represents both an output only display unit and a display unit optionally associated with a keyboard input unit 370 and with one or more optional input devices such as a mouse. External storage unit 390 represents any form of non-volatile storage including, but not limited to, all forms of optical and magnetic storage elements including solid-state storage. Central processing unit 330 may include any programmable controller device including, for example, the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 340 may include one or more memory modules and comprise random access memory (RAM), read only memory (ROM), programmable read only memory (PROM), programmable read-write memory and solid state memory. One of ordinary skill in the art will also recognize that CPU 330 typically includes some internal memory including, for example, cache memory.

Various changes in the materials, components, circuit elements, as well as in the details of the illustrated operational methods are possible without departing from the scope of the following claims. For instance, acts in accordance with FIGS. 1-2 may be performed by a programmable control device executing instructions organized into one or more modules (comprised of computer program code or instructions). A programmable control device may be a single computer processor (e.g., CPU 330), a plurality of computer processors coupled by a communications link or one or more special purpose processors (e.g., a digital signal processor, DSP). Such a programmable control device may be one element in a larger data processing system such as general purpose computer system 320. Storage media, as embodied in storage devices such as 390, 395 and 340, as well as memory internal to CPU 330, suitable for tangibly embodying computer program instructions include, but are not limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices.

Figure 4:
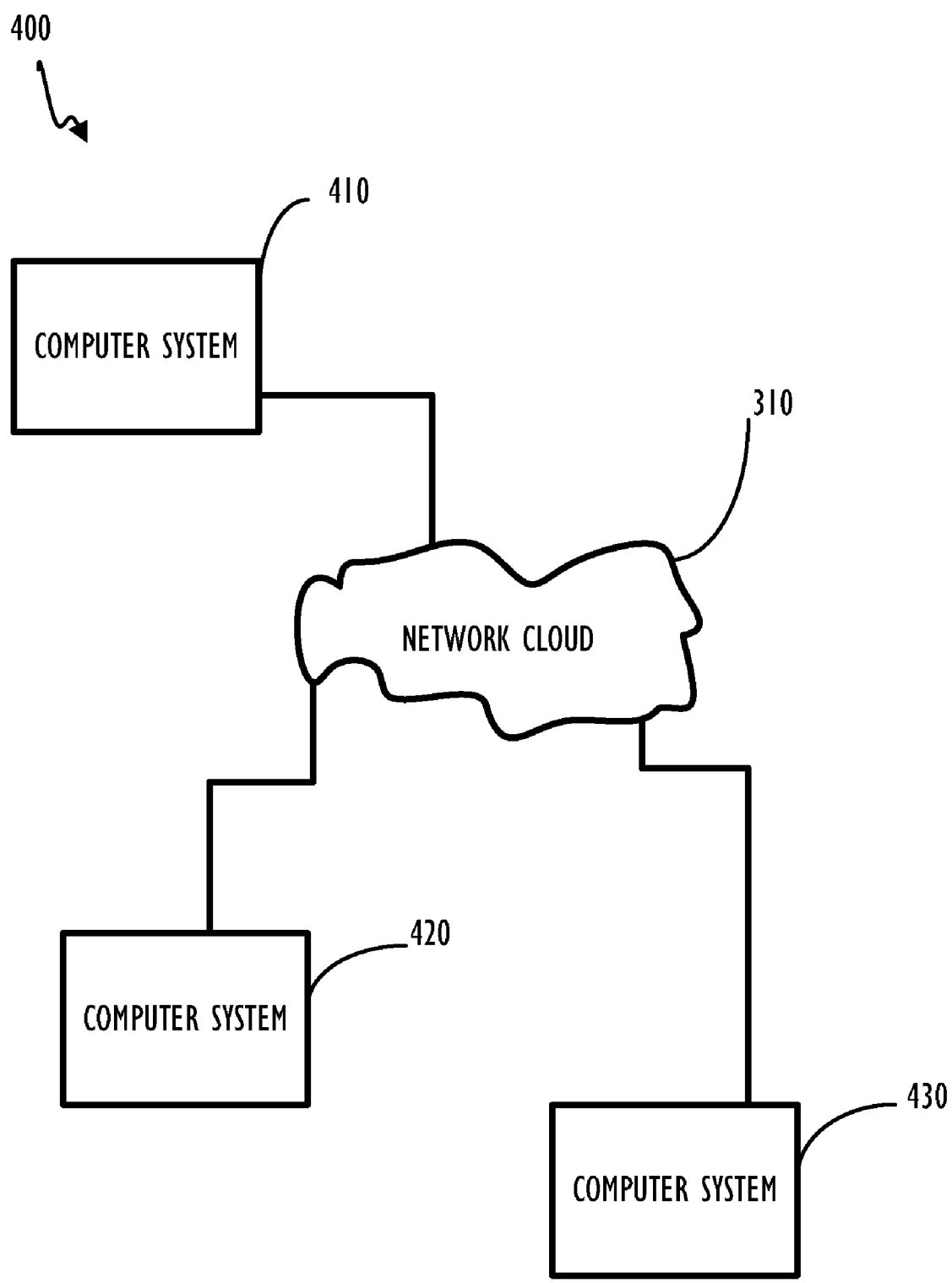
FIG. 4 shows, in block diagram form, a plurality of general purpose computers system communicatively coupled via a computer network.

In addition, computer and network system 300 could be one of a multiplicity of computer systems coupled through a computer network represented by network cloud 310. As illustrated in FIG. 4, computer network 400 comprises multiple computer systems 410, 420 and 430 communicatively coupled to each other through network cloud 310. Network cloud 310 represents a plurality of network technologies enabling computers to be communicatively coupled (e.g., LAN, WAN, POTS, Ethernet, TCP/IP, ATM, etc.). Additionally, other supporting devices (not shown) may be communicatively coupled to computer network 400. These supporting devices are known to those of ordinary skill in the art and include, but are not limited to: network attached storage, printers, file servers, etc. Network cloud 310—could be one or more intranets, one or more extranets (e.g., the Internet) or a combination of both intra- and extranets. In network 400, computer system 420, for example, could include memory for retaining program modules for performing any of the methods illustrated in FIGS. 1-2.

What is claimed is:

1. A computer system configured to manage an annuity product, the computer system method comprising:
   one or more processors wherein the one or more processors are configured to:
      receive an indication of an index;
      associate the indication of the index with a guarantee of investment return for an investment account, wherein the index is external to the investment account and indicates a representation of value of securities constituting the index;
      receive an initial value for the investment account;
      receive an indication of a term indicating an investment period;
      receive an indication of conforming investment option parameters for the investment account corresponding to the term;
      periodically receive investment allocations for the investment account from an account owner;
      alter investment allocations for the investment account during the defined term if the investment allocations do not conform to the investment option parameters; and
      calculate, on the one or more processors, a guaranteed minimum accumulation benefit for the investment account over the term wherein the guaranteed minimum accumulation benefit is calculated using a guarantee percentage increase and the guarantee percentage increase is based at least in part on the index and the investment option parameters.

2. The computer system of claim 1 wherein the investment option parameters are set by the entity receiving the guarantee prior to calculating the guaranteed minimum accumulation benefit.

3. The computer system of claim 1 wherein the insurer sets the investment option parameters.

4. The computer system of claim 1 wherein value of the index is determined at the start of the investment period.

5. The computer system of claim 1 wherein value of the external index is determined at the end of the investment period.

6. The computer system of claim 1 wherein the investment account is augmented at end of the investment period by insurer to a value calculated as, value of the investment account at start of the investment period times guaranteed percentage, compounded periodically, if actual value of the investment account at end of the investment period is below this calculated value.

7. The computer system of claim 1 wherein the guaranteed minimum accumulation benefit is equal to value of the investment account at start of the investment period compounded by the index percentage.

8. The computer system of claim 1 wherein value of the guaranteed minimum accumulation benefit percentage is determined at end of the investment period.

9. The computer system of claim 1 wherein the guaranteed minimum accumulation benefit is provided for one or more account owners.

10. The computer system of claim 1 wherein the one or more processors are further configured to:
    receive an indication to reset at end of a first defined investment period; and
    automatically reset for a second investment period, the reset including updating an account starting value to begin the second investment period.

11. The computer system of claim 1 wherein the guaranteed minimum accumulation benefit is provided for an entity.

12. The computer system of claim 1 wherein the guaranteed minimum accumulation benefit is based on a pre-established external index and a pre-defined method for determining the guaranteed minimum accumulation benefit and the guaranteed minimum accumulation benefit is calculated when an investment period ends.

13. The computer system of claim 12 wherein the pre-established index is based on a plurality of indexes applied at a pre-determined proportion for calculating the guaranteed minimum accumulation benefit.

14. The computer system of claim 1 wherein the one or more processors are further configured to reduce the guaranteed minimum accumulation benefit proportionally, based on withdrawals from the investment account during the term.

15. The computer system of claim 1 wherein the one or more processors are further configured to account for additional premiums credited at any time in a current term into the investment account such that the additional premiums will not be used to calculate the guaranteed minimum accumulation benefit at the end of the current term.

16. The computer system of claim 1 wherein the one or more processors are further configured to increase the guaranteed minimum accumulation benefit as originally guaranteed at the end of the term by an amount of additional premium paid during the term plus interest for the additional premium at a guaranteed rate of return for remainder of term after the additional premium was paid.

17. The computer system of claim 16 wherein the one or more processors are further configured to consider additional premiums in a first year of a term as if the additional premiums had been in the investment account at beginning of term.

18. The computer system of claim 1 wherein index rates are based off value of index rate on a first day of a month for contracts whose term begins in the month.

19. An article of manufacture comprising a non-transitory program storage medium readable by a computer processor and embodying one or more instructions executable by the computer processor to:
    receive an indication of an index;
    associate the indication of the index with a guarantee of investment return for an investment account, wherein the index is external to the investment account and indicating a representation of value of securities constituting the index;
    receive an initial value for the investment account
    receive an indication of a term indicating an investment period;

receive an indication of conforming investment option parameters for the investment account corresponding to the term;

periodically receive investment allocations for the investment account from an account owner;

alter investment allocations for the investment account during the defined term if the investment allocations do not conform to the investment option parameters; and calculate, on the one or more processors, a guaranteed minimum accumulation benefit for the investment account over the term wherein the guaranteed minimum accumulation benefit is calculated using a guarantee percentage increase and the guarantee percentage increase is based at least in part on the index and the investment option parameters.

20. The computer system of claim 1 wherein the one or more processors are further configured to receive an indication specifying an overlay strategy based on options associated with the index; and update the investment account with periodic purchase of the options in conformance with the overlay strategy.

21. A computer system configured to perform an annuity product management method, the computer system comprising:

one or more processors wherein the one or more processors are configured to:

receive an indication specifying an initial value for an investment account;

receive an indication setting investment option parameters for the investment account;

receive an indication specifying an index;

associate the index with the investment account, wherein the index is external to the investment account and indicates a representation of value of securities constituting the index;

receive an indication specifying a term for an investment period;

receive an indication of investment allocations from the investment account owner;

alter investment allocations for the investment account if in the specified term and if the investment allocations do not conform to the set of investment option parameters; and calculate, on the one or more processors, a guaranteed living benefit, for payment to an annuitant, for the investment account over the defined term wherein the guaranteed living benefit is calculated using a guarantee percentage increase and the guarantee percentage increase is based at least in part on the index.

22. The computer system of claim 21 wherein the one or more processors are further configured to:

receive an indication specifying an overlay strategy, the overlay strategy based on options associated with the index; and update the investment account via initiating periodic purchase of the options in conformance with the overlay strategy.

23. The computer system of claim 21 wherein the one or more processors are further configured to calculate the guaranteed living benefit based at least in part on the external index and the investment option parameters.

24. A computer network executing a method to manage an annuity product, the computer network comprising:

one or more non-volatile storage devices for maintaining account information and investment parameters communicatively coupled to the network; and one or more computer systems communicatively coupled to the network, at least one of the one or more computer systems programmed to perform at least a portion of the method to manage an annuity product wherein the entire method to manage an annuity product is performed collectively by the one or more computer systems communicatively coupled to the network; and wherein the method to manage an annuity product comprises:

receiving an indication of an index for association with a guarantee of investment return for an investment account, the index external to the investment account and indicating a representation of value of securities constituting the index;

receiving an initial value for the investment account;

receiving an indication of a term indicating an investment period;

receiving an indication of conforming investment option parameters for the investment account corresponding to the term;

periodically receiving investment allocations for the investment account from an account owner;

altering investment allocations for the investment account during the defined term if the investment allocations do not conform to the investment option parameters; and calculating, on the one or more computer systems, a guaranteed minimum accumulation benefit for the investment account over the term wherein the guaranteed minimum accumulation benefit is calculated using a guarantee percentage increase and the guarantee percentage increase is based at least in part on the index and the investment option parameters.

25. A computer network executing a method to manage an annuity product, the computer network comprising:

one or more non-volatile storage devices for maintaining account information and investment parameters communicatively coupled to the network; and one or more computer systems communicatively coupled to the network, at least one of the one or more computer systems programmed to perform at least a portion of the method to manage an annuity product wherein the entire method to manage an annuity product is performed collectively by the one or more computer systems communicatively coupled to the network and wherein the method to manage an annuity product comprises:

receiving an indication specifying an initial value for an investment account;

receiving an indication setting investment option parameters for the investment account;

receiving an indication specifying an index;

associating the index with the investment account, wherein the index is external to the investment account and indicates a representation of value of securities constituting the index;

receiving an indication specifying a term for an investment period;

receiving an indication of investment allocations from the investment account owner;

altering investment allocations for the investment account if in the specified term and if the investment allocations do not conform to the set of investment option parameters; and calculating, on the one or more computer systems, a guaranteed living benefit, for payment to an annuitant, for the investment account over the defined term wherein the guaranteed living benefit is calculated using a guarantee percentage increase and the guarantee percentage increase is based at least in part on the index.

26. A computer system for calculating a guaranteed minimum accumulation benefit at the end of an investment period, the computer system comprising:
   one or more processors wherein the one or more processors are configured to;
   receive a starting value for an investment account as of the beginning of an investment period;
   receive an indication if investment account allocations were in compliance with investment option parameters for duration of the investment period;
   adjust for investment allocations outside of conformance with the investment option parameters;
   calculate a guaranteed minimum accumulation benefit for the investment account at the end of the specified term using a guarantee percentage increase and the guarantee percentage increase is based at least in part on an index, wherein the index is external to the investment account and indicates a representation of value of securities constituting the index.

27. The computer system of claim 26 wherein the the one or more processors are further configured to:
   receive an ending value for the investment account at the end of the investment period; and
   determine a credit amount for the investment account if the ending value is less than the sum of the starting value and the guaranteed minimum accumulation benefit.

* * * * *